United States Patent
Dandeu et al.

(10) Patent No.: US 8,624,048 B2
(45) Date of Patent: Jan. 7, 2014

(54) METHOD OF PRODUCING ALKYL ESTERS FROM VEGETABLE OR ANIMAL OIL AND AN ALIPHATIC MONOALCOHOL WITH FIXED-BED HOT PURIFICATION

(75) Inventors: Aurelie Dandeu, Saint-Just Chaleyssin (FR); Vincent Coupard, Villeurbanne (FR); Laurent Bournay, Chaussan (FR); Charlotte Rouquette, Suresnes (FR)

(73) Assignee: IFP Energies Nouvelles, Rueil-Malmaison Cedex (FR)

( * ) Notice: Subject to any disclaimer, the term of this patent is extended or adjusted under 35 U.S.C. 154(b) by 332 days.

(21) Appl. No.: 12/968,643

(22) Filed: Dec. 15, 2010

(65) Prior Publication Data

US 2011/0144364 A1    Jun. 16, 2011

(30) Foreign Application Priority Data

Dec. 16, 2009  (FR) ...................................... 09 06097

(51) Int. Cl.
*C11C 3/00*  (2006.01)
(52) U.S. Cl.
USPC ........................................................ 554/167
(58) Field of Classification Search
USPC ........................................................ 554/167
See application file for complete search history.

(56) References Cited

U.S. PATENT DOCUMENTS

| | | | |
|---|---|---|---|
| 3,036,102 A | 5/1962 | Pons, Jr. et al. | |
| 4,880,652 A | 11/1989 | Regutti | |
| 5,079,208 A | 1/1992 | Lammers et al. | |
| 5,391,385 A | 2/1995 | Seybold | |
| 6,147,196 A * | 11/2000 | Stern et al. | 554/170 |
| 6,638,551 B1 | 10/2003 | Levy et al. | |
| 2009/0300972 A1 | 12/2009 | Jalalpoor et al. | |

FOREIGN PATENT DOCUMENTS

| | | |
|---|---|---|
| EP | 0 376 406 A1 | 7/1990 |
| WO | WO 03/075671 A1 | 9/2003 |
| WO | WO 2007/098928 A1 | 9/2007 |
| WO | WO 2007098928 A1 * | 9/2007 |

OTHER PUBLICATIONS

Search Report of FR 0906097 (Aug. 18, 2010).

* cited by examiner

*Primary Examiner* — Deborah D Carr
(74) *Attorney, Agent, or Firm* — Millen, White, Zelano & Branigan, P.C.

(57) ABSTRACT

The present invention relates to a method of producing alkyl esters and glycerin from a crude or semi-refined vegetable oil and an aliphatic monoalcohol, comprising a deep pretreatment purification stage to eliminate the species based on phosphorus, calcium, magnesium, zinc or iron, insoluble under the temperature conditions of the heterogeneous catalytic reactor.

17 Claims, No Drawings

METHOD OF PRODUCING ALKYL ESTERS FROM VEGETABLE OR ANIMAL OIL AND AN ALIPHATIC MONOALCOHOL WITH FIXED-BED HOT PURIFICATION

CROSS REFERENCE TO RELATED APPLICATIONS

This application is related to a concurrently filed application entitled "PROCESS FOR CONVERTING FEEDS DERIVED FROM RENEWABLE SOURCES WITH PRE-TREATMENT OF FEEDS BY HOT DEPHOSPHATATION", based on French priority 09/06.102, filed on Dec. 16, 2009, incorporated by reference herein.

FIELD OF THE INVENTION

The invention relates to a method of producing alkyl esters from vegetable or animal oils and an aliphatic monoalcohol.

BACKGROUND OF THE INVENTION

Vegetable oil alkyl esters intended to be used as biofuel are produced from vegetable oils obtained for example from rapeseed, sunflower, soybean or even palm. Ill-suited for directly feeding modern diesel engines of private cars, vegetable oils essentially consisting of triglycerides have to be converted by means of a transesterification reaction with an alcohol, methanol or ethanol for example, introduced in excess to produce vegetable oil methyl esters and glycerin. This reaction is schematized as follows:

1 triglyceride+3 alcohols→3 fatty matter esters+glycerin

In cases where the transesterification reaction is coupled with an esterification reaction, the reaction schemes are as follows:

Fatty acid+alcohol→fatty acid esters+water

Fatty acid+glycerin→glyceride+water

Alkyl ester production methods have already been developed. Some use the conventional routes of homogeneous catalysis with soluble catalysts such as soda or sodium methylate, by reacting a neutral oil and an alcohol. Examples thereof are the methods described in patent EP-0,523,767, with continuous use of a basic homogeneous catalyst, or in patent FR-B1-2,890,961 filed by the applicant, which describes an ethyl ester production method. However, this type of method involves several drawbacks. It is in fact necessary to implement a complex and laborious chain of treatments in order to reach the specifications sought for the glycerin and the ester produced.

Heterogeneous catalysis methods have been described. Patent FR-B1-2,752,242 describes a method of producing a fatty acid ester and glycerin of high purity from a vegetable oil and an aliphatic monoalcohol in the presence of a solid catalyst based on zinc aluminate. Patents FR-B-2,855,517, FR-B-2,855,518 and FR-B-2,855,519 describe alkyl ester production methods involving catalysts based on mixed oxides comprising titanium, zirconium, antimony and/or aluminium. Patents FR-B-2,869,612 and FR-B-2,869,613 describe the use of catalysts based on zinc, bismuth, titanium and/or aluminium oxides. More recently, patent FR-B-2,914,927 describes the use of a heterogeneous catalyst based on phosphate or an organophosphorus compound of group 4. Patent application WO-2007/043,062 that describes a transesterification method using acid catalysts based on zinc ferrocyanide can also be mentioned.

Heterogeneous methods allow to obtain high alkyl ester yields, as well as a glycerin of high purity. The latter point has a very significant impact on the economy of the method since the price of glycerin essentially depends on its purity level.

Vegetable oils of terrestrial or aquatic origin, or animal fats used as raw material in these methods are mainly made up of triglycerides, in a proportion of 80-98 wt. %. The minor constituents, present in a proportion of 2 to 20 wt. %, are free fatty acids, mono- and diglycerides, glyceride oxide compounds resulting from the degradation of oil, waxes (natural hydrocarbons present in oils), proteins containing sulfur and/or nitrogen, phospholipids, tocopherols, sterols, natural colorants, as well as more or less volatile odorant compounds. Crude oils can also contain as minor compounds species containing heteroelements such as phosphorus, magnesium, calcium, iron or zinc, in proportions up to 2500 ppm, mainly in form of phospholipids and/or sterols in the case of phosphorus, magnesium and calcium, or present in pigments in the particular case of magnesium and in form of sterols in the case of iron and/or zinc (Oils and fats manual: A comprehensive treatise, Volume 1, page 90, Karleskind A. et al.).

In order to eliminate these minor compounds, the pressed or extracted crude oil is conventionally refined so it can be used. For use as biofuel, the conventional oil refining stages are as follows:

- degumming consists in removing the phospholipids or mucilages that precipitate in the presence of acidulated water,
- neutralizing the degummed oil in the presence of a soda solution allows to neutralize at least part of the free fatty acids present in the oil. The soap stocks formed during this stage carry along part of the impurities contained in the oil,
- water wash to eliminate sodium salt traces,
- vacuum drying.

The oil obtained after this refining process is referred to as semi-refined oil. Other operations such as decolorization and deodorization are actually necessary to obtain food grade oil or "refined oil".

However, after refining, the oils referred to as semi-refined can still contain up to 20 ppm phosphorus, calcium, magnesium, in form of phospholipids, and iron or zinc in form of sterols (Oils and fats manual: A comprehensive treatise, Volume 1, page 90, Karleskind A. et al.).

Under the temperature conditions of the heterogeneous transesterification method, these species are converted to mixed calcium and magnesium phosphate of $Ca_xMg_y(PO_4)_z$ type, insoluble in the reaction medium. These solid species then settle in the catalytic bed and involve delicate operation of the reactor, with a pressure drop increase in the reactor and catalyst deactivation through pore clogging. These species can also leave the reactor and be carried in the glycerin treatment circuit. The quality of the glycerin is then degraded by the presence of these solid species. In the particular case of a process operating in two stages with partial recycle of elements of the glycerin separation chain (glycerin, methanol and unconverted species) as described in patent FR-B-2,838,433, these impurities circulate then in different places in the process, even upstream from the reactor, and cause operating clogging problems. In order to make this process operable, the allowable feeds have been limited to the semi-refined or DND (Degummed, Neutralized and Dried) feeds.

On the other hand, in addition to phospholipids, these oils naturally contain glucosylated sterols (up to 500 ppm depending on origins) that can come in two different forms: acylated and non-acylated glucosylated sterols, which cause clogging problems in the heterogeneous transesterification reactor and in the final esters as regards their resistance to cold, in particular non-acylated glucosylated sterols (Robert A. et al., *J. Am. Oil Chem. Soc.* (2008) 85: 761-770). Now conventional oil refining does not allow them to be eliminated.

Patent application WO-2007/098,928 concerns a method for physical refining of feeds based on triglycerides used in biodiesel preparation methods. After a degumming stage, the triglycerides are contacted with adsorbent particles, at atmospheric pressure, at temperatures ranging between 60° C. and 90° C., in order to decrease their phosphorus content. This adsorption stage is followed by a filtration stage, then the product obtained is subjected to a stripping stage intended to reduce the free fatty acid content.

The method provided comprises a succession of several stages, which involves relatively high operating costs. On the other hand, the temperatures at which the oil refining stages are carried out do not exceed approximately 100° C. The processes involved are adsorption-on-solid phenomena, known to operate in an optimized manner at relatively low temperatures.

It seems necessary to be able to control and limit the proportion of clogging insoluble species in order to improve the operability of industrial plants, without introducing too large a number of stages in the processes so as to limit operating costs. The activity and the life of the catalyst, as well as the quality of the esters and of the glycerin co-produced, can thus be improved.

An objective of the present invention is to provide a vegetable or animal oil transesterification method comprising a crude or semi-refined oil pre-treatment stage allowing to eliminate the hetero-elements contained in the minor compounds such as phosphorus, magnesium, calcium, iron and/or zinc.

Consequently, this invention makes it possible to use a crude oil that has undergone no pre-treatment or a semi-refined oil as defined above as the feed in the method of transesterification of oils by an alcohol. Furthermore, pre-treatment allows concentration of the impurities and conversion thereof to a valorizable solid (fertilizer for example).

SUMMARY OF THE INVENTION

The present invention describes a method of producing alkyl esters and glycerin from a crude or semi-refined vegetable or animal oil and an aliphatic monoalcohol, comprising a deep purification stage allowing to remove the species containing hetero-elements based on phosphorus, calcium, iron, magnesium or zinc insoluble under the temperature conditions of the heterogeneous catalytic reactor.

DETAILED DESCRIPTION

The method of preparing fatty acid alkyl esters and glycerin according to the present invention implementing one or more transesterification reactions between a crude or semi-refined vegetable oil of terrestrial or aquatic origin or animal oil and an aliphatic monoalcohol, and using a heterogeneous catalyst, comprises at least one stage of pre-treating said oil that consists in passing it into a reactor comprising at least one fixed bed of at least one adsorbent comprising a porous refractory oxide free of catalytic metals selected from groups 6 and 8 to 12 of the periodic table, at a temperature ranging between 140° C. and 320° C., at pressures ranging between 0.1 and 7 MPa and with a residence time ranging between 0.1 and 1 hour.

In the sense of the present invention, a semi-refined oil is an oil that has undergone a degumming, neutralizing and water wash stage.

Preferably, the pre-treatment stage is carried out at a temperature ranging between 160° C. and 190° C., at a pressure ranging between 0.3 and 1 MPa, with a residence time ranging between 0.2 and 0.8 hour.

Thus, by means of the pre-treatment according to the invention, the phosphorus content that indicates the proportion of hetero-element in the oil after pre-treatment is below 1.5 ppm, preferably below 1 ppm. The calcium, magnesium, iron and/or zinc content is therefore also below 1.5 ppm, preferably below 1 ppm.

The phosphorus, magnesium, iron, zinc and/or calcium content is determined by inductively coupled plasma spectroscopy analysis (ICP-OES), for example with the method described in standard EN 14,241, i.e. with a sensitivity for these elements given at 1 ppm.

During the crude or semi-refined oil pre-treatment stage, precipitation of a solid containing the impurities based on phosphorus, calcium, iron, zinc or magnesium is observed after heating under the temperature conditions according to the method of the invention.

The function sought during crude or semi-refined oil pre-treatment being only a thermal conversion of the hetero-elements to mixed phosphate and immobilization by adsorption, and not a catalytic function, the pre-treatment reactor comprises at least one fixed bed of an adsorbent material free of catalytic metals.

The pre-treatment stage consists in passing the crude or semi-refined vegetable or animal oil into a reactor comprising at least one fixed bed of at least one adsorbent comprising a porous refractory oxide free of catalytic metals, selected from groups 6 and 8 to 12 of the periodic table. Preferably, the adsorbents used in the pre-treatment stage are selected from among alumina, optionally activated, and silica-alumina.

More preferably, said adsorbents consist of 100% porous refractory oxide preferably selected from among alumina, optionally activated, and silica-alumina.

According to the invention, the adsorbents are used in a fixed bed, also referred to as guard bed, with the specific feature that said guard bed is used with a minimum temperature of activation of the thermal crystallization and/or precipitation reaction sought.

Advantageously, the adsorbents used in the pre-treatment stage according to the method of the invention are shaped. The shapes of the adsorbents can be spherical, oblong, cylindrical, for example in form of extrudates, hollow or solid, twisted cylindrical, multilobe, for example with a number of lobes ranging between 2 and 5, or in form of rings.

Preferably, the adsorbents come in form of spheres or extrudates, with a diameter ranging between 0.5 and 20 mm, preferably between 0.5 and 10 mm, and most preferably in form of spheres.

Said adsorbents can advantageously have more particular geometrical shapes in order to increase their void fraction. Examples of such particular adsorbent shapes are: hollow cylinders, hollow rings, Raschig rings, indented hollow cylinders, castellated hollow cylinders, wagon wheels, Blend saddle, multi-hole cylinders.

The void fraction of these adsorbents advantageously ranges between 0.2 and 0.75, preferably between 0.35 and 0.5.

Their outside diameter advantageously ranges between 1 and 35 mm.

Preferably, said adsorbents exhibit macroporosity. Their macropore volume, measured by mercury intrusion, shows a pore volume, for pores whose average diameter is 500 Å, above 0.1 ml/g, and preferably ranging between 0.125 and 0.4 ml/g. Said adsorbents also advantageously have a total pore volume above 0.60 ml/g, preferably ranging between 0.625 and 1.5 ml/g, and a specific surface area expressed in $S_{BET}$ advantageously ranging between 30 m²/g and 320 m²/g.

More preferably, the adsorbent used is a macroporous spherical alumina of pore volume ranging between 1.0 and 1.3 ml/g and of diameter ranging between 4 and 6 mm, marketed by Axens and catalog referenced under reference ACT 139.

The adsorbents can be used alone or in admixture. It can be particularly advantageous to superpose different adsorbents in at least two different beds of variable height. The adsorbents having the highest void fraction are preferably used in the first bed(s) at the pre-treatment reactor inlet.

During said pre-treatment of the crude or semi-refined oil, precipitation of a solid containing impurities based on phosphorus, calcium, magnesium, iron and/or zinc is observed after heating under suitable temperature conditions.

The solid impurities settle then on the fixed adsorbent bed, or guard bed, with the specific feature that said guard bed is used with a minimum temperature of activation of the desired thermal crystallization and/or precipitation reaction.

According to a preferred embodiment of the method of the present invention, the pre-treatment stage is carried out in a reactor comprising several fixed beds, arranged in parallel, and permutable. It is thus possible to remove one of the guard beds so as to clean it when the adsorbent(s) it is made up of are saturated with solid impurities.

Each bed can comprise one or more adsorbents.

In case of implementation of the stage of pre-treatment of at least one adsorbent in permutable fixed beds, permutation of the impurity-saturated adsorbent bed is advantageously achieved when the proportion of phosphorus, calcium, magnesium, zinc or iron in the oil after the pre-treatment stage is above 2 ppm.

The impurity-saturated adsorbent bed can be sent to a cleaning stage.

Several options can be considered for the stage of cleaning a saturated guard bed.

According to an embodiment, the saturated guard bed can be extracted from the pre-treatment reactor. In this case, the liquid, then the solid can be emptied out and this part of the reactor can be cleaned. Recharging can be advantageously performed with a new adsorbent feed, or with the previous feed, cleaned for example with a solvent or regenerated by burning, prior to setting this part of the reactor into the pre-treatment reactor again.

According to another regeneration mode, cleaning the saturated adsorbent bed can be done by line flushing with a co-current or counter-current solvent stream so as to take off and/or to solubilize the particles present. The solvent can be a light hydrocarbon, polar or not, and it is advantageously selected from among methanol, pentane, ethanol, heptane or hexane. After separation of the solid extracted and of the extraction solvent at the reactor outlet, the solvent is advantageously recycled to the reactor to continue extraction.

According to another embodiment, the solid impurity-saturated guard bed cleaning stage can be carried out by in-situ burning.

The saturated adsorbent bed can be valorized as an impurity-enriched solid. In fact, using a high operating temperature (for example above 250° C.) notably allows to form a solid residue of better quality, as regards the crystallinity thereof, which makes it more interesting as far as valorization is concerned.

The feeds used during the pre-treatment stage according to the method of the present invention are fatty matter corresponding to natural or elaborated substances, of vegetable or animal origin, commonly referred to as oil.

The feed treated in the pre-treatment stage according to the invention is a crude vegetable oil, of terrestrial or aquatic origin, or animal oil predominantly consisting of triglycerides in a proportion of 80-98 wt. %. The minor compounds, i.e. present in a proportion of 2 to 20 wt. %, are free fatty acids, mono- and diglycerides, glyceride oxide compounds resulting from the degradation of oil, polymers, waxes (natural hydrocarbons present in oils), proteins containing sulfur and/or nitrogen, phospholipids, tocopherols, sterols, natural colorants, as well as more or less volatile odorant compounds. Said crude oils can also contain as minor compounds species containing hetero-elements such as phosphorus, magnesium calcium, iron or zinc, in proportions up to 2500 ppm, mainly in form of phospholipids and/or sterols in the case of phosphorus, magnesium and calcium, or in form of sterols in the case of iron and/or zinc.

Examples of oils that can be used are all the common oils, such as palm oil (concrete or olein), soybean oil, palm nut oil, copra oil, babassu oil, rapeseed oil (old or new), sunflower oil (conventional or oleic), corn oil, cotton oil, peanut oil, pourgher oil (*Jatropha curcas*), castor oil, linseed oil and crambe oil, and all the oils obtained from sunflower and rapeseed for example by genetic engineering or hybridization, or obtained from algae.

The oils used also include partly modified oils, by polymerization or oligomerization for example, such as, for example, linseed oil and sunflower stand oils, and blown vegetable oils.

The oils used are neutral or acid, virgin or recycled.

Pre-treatment according to the present invention has a significant efficiency for removal of non-acylated glucosylated sterols. This pre-treatment can thus also be used upstream from a homogeneous transesterification plant.

In accordance with the method of preparing alkyl esters and glycerin according to the present invention, the fatty matter obtained after the pre-treatment stage and containing less than 1 ppm phosphorus, calcium, iron, zinc or magnesium is sent to the transesterification reactor.

The heterogeneous catalyst used in the transesterification reaction stages can be any catalyst known to the person skilled in the art for its fatty matter transesterification activity. The catalysts described in the following patent applications can for example be mentioned: FR-2,752,242, FR-2,855,517, FR-2,855,518, FR-2,855,519, FR-2,869,612, FR-2,869,613, FR-2,914,927 or WO 2007/043,062.

By way of non-exclusive example, the catalyst used in the method according to the invention is a solid containing zinc oxide and at least a solid solution of general formula $Zn_xAl_2O_{(3+x)}$, the free zinc oxide being present between 5 and 30 mass %, and x contained in the ]0;1[ range, as described in patent application FR-08/07,413 filed by the applicant.

The aliphatic monoalcohol used in the method according to the invention comprises for example 1 to 18 carbon atoms, preferably 1 to 5. It can be selected from among methyl, ethyl, isopropyl, propyl, butyl, isobutyl or amyl alcohol.

The operating conditions of the transesterification reaction are described in patent FR-B-2,838,433: the method is operated at temperatures ranging between 130° C. and 220° C., at pressures below 10 MPa, with excess monoalcohol with respect to the oil/alcohol stoichiometry.

Generally, the transesterification reaction can be carried out according to different embodiments.

In the case of a discontinuous reaction, one or two stages can be carried out, i.e. a first reaction up to 85 to 95% conversion to esters, cooling by evaporating the excess alcohol, decanting the glycerin, and completing the reaction by heating again to between 130° C. and 220° C., and by adding alcohol so as to obtain total conversion.

A 98% conversion to esters can also be aimed at by working for a sufficiently long time in a single stage under suitable conditions, for example by increasing the temperature and/or the alcohol/fatty matter ratio.

If a continuous fixed-bed method is selected, the reaction is carried out in one or more successive fixed-bed reactors operated with an ascending flow and in liquid phase, each reactor being supplied with a mixture of oil and alcohol (first reactor) or predominantly of ester and alcohol (second reactor). The proportion of oil or ester represents between 20 and 80 mass %, preferably between 37 and 50 mass %.

The water content of the reaction medium is controlled so as to remain below 1500 ppm by mass, and preferably below 1000 ppm. At the outlet of the reactor(s), ester, glycerin and excess alcohol are obtained. After several alcohol evaporations and separations of the ester and of the glycerin by decantation, very pure and readily valorizable products are obtained.

The ester fuel obtained has a monoglyceride content of 0.8 mass % at most, a diglyceride content of 0.2 mass % at most, a triglyceride content of 0.2 mass % at most and a glycerin content below 0.25 mass %.

With this type of method, final purification is reduced to the minimum while allowing to obtain an ester meeting the fuel requirements and a glycerin of purity ranging between 95 and 99.9%, preferably between 98 and 99.9%.

The leaching resistance is checked in the present invention with a proportion of dissolved metal traces from the catalyst, in the ester formed as well as in the glycerin produced, below 1 ppm.

By means of the pre-treatment stage carried out according to the method of the present invention, the residual phosphorus, calcium, iron, zinc or magnesium content is below 1.5 ppm in each phase.

The catalyst stability is assessed experimentally over time by monitoring its activity (triglyceride conversion and/or rapeseed methyl ester yield).

The effluents are analysed either by gas chromatography for the esters and the glycerin or, more rapidly, by steric exclusion liquid chromatography for the esters.

The examples below illustrate the invention without limiting the scope thereof.

EXAMPLES

Examples 1 to 3 were carried out in a traversed fixed-bed reactor with a DNS grade oil or a semi-refined oil pre-treated under different conditions. They allow to compare the impact of the oil pre-treatment on the transesterification catalyst activity over time under conditions close to industrial operating conditions, and on the quality of the glycerin obtained. The oil used in these examples is rapeseed oil whose fatty acid composition is given in Table 1. However, any other oil of vegetable origin could give similar results.

TABLE 1

Global fatty acid composition of the rapeseed oil

| Fatty acid glyceride | Nature of the fatty chain | mass % |
|---|---|---|
| Myristic | C14:0 | 01.1 |
| Palmitic | C16:0 | 5 |
| Palmitoleic | C16:1 | <0.5 |
| Stearic | C18:0 | 2 |
| Oleic | C18:1 | 59 |
| Linoleic | C18:2 | 21 |
| Linolenic | C18:3 | 9 |
| Arachidic | C20:0 | <0.5 |
| Gadoleic | C20:1 | 1 |
| Behenic | C22:0 | <0.5 |
| Erucic | C22:1 | <1 |

| Phospholipid analysis | | ppm |
|---|---|---|
| Phosphatidyehanolamine | (PE) | 16.8 |
| Phospatodylcholine | (PC) | 21.9 |
| Sphingomyeline | (SM) | <0.1 |
| Lysophosphatidylcholine | (LPC) | <0.1 |
| Lysophosphatidylethanolamine | (LPE) | <0.1 |
| Phosphatidic acid | (AP) | 61.3 |
| Phosphtidyl Serine | (PS) | <0.1 |

The phosphorus, magnesium, calcium content of this semi-refined oil is given in Table 2.

TABLE 2

P, Ca, Mg composition of the semi-refined rapeseed oil

| Species | Content in ppm |
|---|---|
| P | 9 |
| Ca | 5 |
| Mg | 2 |

The acid number of the DNS oil, determined according to the EN14104 method, is below 0.2 mg KOH/g oil.

In the examples, the Fe content determined by ICP is below the quantification limit (<1 ppm), for the feed as well as for the effluent. However, the pre-treatment method also proves to be efficient as regards iron uptake, as shown by the SEM-EDX analysis performed on the adsorbent mass after testing. In fact, the qualitative analysis shows the presence of zones rich in elemental iron, not associated with a counterion, showing that it is not a corrosion residue.

Examples 4 to 5 were carried out in a traversed fixed-bed reactor with a crude oil pre-treated under different conditions. They allow to compare the impact of the oil pre-treatment on the transesterification catalyst activity over time under conditions close to industrial operating conditions, and on the quality of the glycerin obtained. The oil used in these examples is crude rapeseed oil whose fatty acid composition is as shown in Table 1. However, any other oil of vegetable origin could give similar results.

The phosphorus, magnesium, calcium and iron content of this crude oil is given in Table 3.

TABLE 3

P, Ca, Mg composition of the crude rapeseed oil

| Species | Content in ppm |
|---|---|
| P | 101 |
| Ca | 86 |

TABLE 3-continued

| | |
|---|---|
| Mg | 14 |
| Fe | 1 |

| Global composition of the crude rapeseed oil | |
|---|---|
| | Content in wt. % |
| Triglycerides | 97.2 |
| Diglycerides + sterols | 0.2 |
| Esterified sterols | 1.8 |
| Free sterols + others, including phospholipids | 0.8 |

The acid number of the crude rapeseed oil, determined according to the EN14104 method, is 1.2 mg KOH/g oil.

Example 6 shows the efficiency of the pre-treatment according to the present invention for uptake of the glucosylated sterols in a semi-refined rapeseed oil.

The adsorbent used in the pre-treatment stage and the operating conditions of the transesterification stage are identical in all the examples.

The oil is pre-treated in a 3.6-1 volume reactor entirely filled with a fixed adsorbent bed consisting of a spherical alumina of diameter ranging between 3 and 6 mm. The alumina exhibits a macropore volume, measured by mercury intrusion, i.e. a pore volume, for pores whose average diameter is 500 Å, of 0.35 ml/g, a total pore volume of 1.2 ml/g and a specific surface area expressed in $S_{BET}$ of 140 m$^2$/g.

The heterogeneous catalyst used in the transesterification reaction is a solid prepared by kneading an alumina and zinc oxide gel (same origin as in the previous examples) in the presence of 5.8% nitric acid in solution in water, so as to obtain a material composition whose elemental analysis gives 39% Zn and 27% Al. The material obtained is extruded with a 3-mm diameter die and subjected to a thermal treatment at 650° C. for 2 h.

X-ray diffraction allows quantitative determination of the various phases. 27% zinc oxide ZnO and two solid solutions, one rich in zinc and the second rich in aluminium, are detected.

Structure refinement analysis allows to obtain the composition of each one of these phases: ZnO (27%), $Zn_{0.7}Al_2O_{3.7}$ (51%, cell parameter 8.08 Å) and $Zn_{0.33}Al_2O_{3.33}$ (22%, cell parameter 8.01 Å).

In these examples, the catalyst is used in a single stage. In order to obtain a biodiesel meeting specifications, it would be necessary to perform, at the end of this first stage, decantation by evaporating the alcohol and by cooling, then to complete the transesterification reaction by adding the evaporated alcohol part.

In order to implement this first catalytic stage, 15 cm glass balls are fed into a 166-cm$^3$ tubular reactor, then 83 g catalyst in form of extrudates, and 64 cm glass balls, the assembly being heated by means of heating shells. A catalyst drying stage is carried out in a methanol stream at ambient temperature, when the water content of the outgoing methanol is equal to the water content of the incoming methanol, the rapeseed oil is injected at a LHSV of 1 h$^{-1}$ (volume of oil per volume of catalyst per hour), a 0.8 mass ratio between the oil and the methanol being used. Three different temperatures were tested, the last point at 185° C. is a return point allowing to check the stability of the catalyst tested. The total duration of a test is 300 h. Samples are taken when the plant is under stabilized regime conditions.

Example 1 (Comparative)

Method of Preparing Methyl Esters and Glycerin from a Non-Pretreated Semi-Refined Vegetable Oil and Methanol The first example comprises only a transesterification stage. The composition of the oil used in the transesterification reaction is given in Table 1. The phosphorus, calcium and magnesium content is given in Table 2.

The catalyst described above is used under the operating conditions that are also described above. Samples are taken when the plant is under stabilized regime conditions at various temperatures and analysed by gas chromatography (GC). The analysis results are given in the table below.

TABLE 4

Composition of the effluents of Example 1

| Mass % | Triglycerides wt. % | Diglycerides wt.$^a$ % | Monoglycerides wt. % | Methyl esters wt. % |
|---|---|---|---|---|
| 185° C. | 6.20 | 4.10 | 4.40 | 85.30 |
| 165° C. | 19.90 | 9.10 | 5.10 | 65.90 |
| 175° C. | 13.50 | 6.80 | 4.80 | 74.90 |
| 185° C. (return point) | 9.70 | 5.10 | 4.60 | 80.50 |

$^a$% representing the diglycerides and sterols

The catalyst used without any oil pre-treatment stage has an activity that decreases over time. This activity loss is highlighted by comparing the catalyst performances between the direct point at 185° C. and the return point.

After transesterification, the effluents are separated by vaporization of the methanol, then by decantation. The glycerin and ester phases obtained are analysed by ICP. The phosphorus, calcium and magnesium content is given in Table 5. This table shows that the quality of the glycerin is not optimum.

TABLE 5

P, Ca, Mg composition in the glycerin and ester phases

| Species | Content in ppm (glycerin phase) | Content in ppm (ester phase) |
|---|---|---|
| P | 8 | <1 ppm |
| Ca | 5 | <1 ppm |
| Mg | 2 | <1 ppm |

During this test on the operation of the pilot plant, a pressure drop increase has been observed. During reactor unloading, a solid deposit at the reactor inlet has been observed on the catalyst, which may explain this phenomenon. Carrying out a P, Mg, Ca material balance is delicate because it is difficult to dissociate the deposit from the catalyst.

Example 2 (not in Accordance with the Invention)

Method of Preparing Methyl Esters and Glycerin from a Semi-Refined Vegetable Oil and Methanol with Low-Temperature Oil Pre-Treatment The second example comprises a low-temperature oil pre-treatment stage and a pre-treated oil transesterification stage.

The fatty acid composition of the oil fed into the pre-treatment reactor is given in Table 1. The phosphorus, calcium and magnesium content is given in Table 2.

The pre-treatment operating conditions are 130° C., 0.7 MPa, and a residence time of 35 minutes.

At the pre-treatment reactor outlet, the fatty acid composition is unchanged. On the other hand, the phosphorus, calcium and magnesium content is given in Table 6. The purification efficiency is 33% for phosphorus, 20% for calcium and 25% for magnesium.

TABLE 6

P, Ca, Mg composition of the rapeseed oil after pre-treatment at 130° C. The partly purified oil is then supplied to the transesterification reactor. The catalyst and the operating conditions are the same as those given in Example 1.

| Species | Content in ppm |
| --- | --- |
| P | 6 ppm |
| Ca | 4 ppm |
| Mg | 1.5 ppm |

Samples are taken when the plant is under stabilized regime conditions at various temperatures and analysed by GC. The analysis results are given in Table 7.

TABLE 7

Composition of the effluents of Example 2

| Mass % | Triglycerides Wt. % | Diglycerides wt.$^a$ % | Monoglycerides wt. % | Methyl esters wt. % |
| --- | --- | --- | --- | --- |
| 185° C. | 6.20 | 4.20 | 4.10 | 85.50 |
| 165° C. | 20 | 9.20 | 5.20 | 66 |
| 175° C. | 13.10 | 6.90 | 4.90 | 75.10 |
| 185° C. (return point) | 9.00 | 5.30 | 4.90 | 80.70 |

$^a$% representing the diglycerides and sterols

The catalyst used with partial oil pre-treatment has an activity that decreases over time. The purification quality does not seem sufficient to obtain catalyst stability during the 300-h test.

After transesterification, the effluents are separated by vaporization of the methanol, then by decantation. The glycerin and ester phases obtained are analysed by ICP. The phosphorus, calcium and magnesium content is given in Table 8. This table shows that the quality of the glycerin is not optimum.

TABLE 8

P, Ca, Mg composition in the glycerin and ester phase

| Species | Content in ppm (glycerin phase) | Content in ppm (ester phase) |
| --- | --- | --- |
| P | 7 | <1 ppm |
| Ca | 3 | <1 ppm |
| Mg | 1 | <1 ppm |

During this test on the operation of the pilot plant, a pressure drop increase has also been observed. During reactor unloading, a solid deposit on the catalyst at the reactor inlet has been observed, which may explain this phenomenon. Carrying out a P, Mg, Ca material balance is delicate because it is difficult to dissociate the deposit from the catalyst.

Example 3 (According to the Invention)

Method of Preparing Methyl Esters and Glycerin from a Semi-Refined Vegetable Oil and Methanol with High-Temperature Oil Pre-Treatment This example comprises a high-temperature oil pre-treatment stage and a pre-treated oil transesterification stage.

The fatty acid composition of the oil fed into the pre-treatment reactor is given in Table 1. The phosphorus, calcium and magnesium content is given in Table 2.

The operating conditions are 180° C., 0.7 MPa, and a residence time of 35 minutes.

At the reactor outlet, the fatty acid composition is unchanged (see Table 1). On the other hand, the phosphorus, calcium and magnesium content is given in Table 9. The purification quality is above 85% for phosphorus. Determining the purification rate is delicate because of the detection limit of the analysis device.

TABLE 9

P, Ca, Mg composition of the rapeseed oil after pre-treatment at 180° C.

| Species | Content in ppm |
| --- | --- |
| P | <1 ppm |
| Ca | <1 ppm |
| Mg | <1 ppm |

The pre-treated oil is then supplied to the transesterification reactor. The catalyst and the operating conditions are the same as those given in Example 1.

Samples are taken when the plant is under stabilized regime conditions at various temperatures and analysed by GC. The analysis results are given in Table 10.

TABLE 10

Composition of the effluents of Example 3

| Mass % | Triglycerides wt. % | Diglycerides wt.$^a$ % | Monoglycerides wt. % | Methyl esters wt. % |
| --- | --- | --- | --- | --- |
| 185° C. | 6.10 | 4.20 | 4.30 | 85.40 |
| 165° C. | 18.90 | 8.10 | 4.10 | 68.90 |
| 175° C. | 11.50 | 6.80 | 4.80 | 74.90 |
| 185° C. (return point) | 6.20 | 4.10 | 4.40 | 85.30 |

$^a$% representing the diglycerides and sterols

The catalyst used with high-temperature oil pre-treatment has a stable activity over time. Furthermore, the catalytic activity of this catalyst is higher than that of a catalyst used without an oil pre-treatment stage.

After transesterification, the effluents are separated by vaporization of the methanol, then by decantation. The glycerin and ester phases obtained are analysed by ICP. The phosphorus, calcium and magnesium content is given in Table 11. This table shows that the glycerin is free of phosphorus, calcium and magnesium.

TABLE 11

P, Ca, Mg composition in the glycerin and ester phases

| Species | Content in ppm (glycerin phase) | Content in ppm (ester phase) |
| --- | --- | --- |
| P | <1 ppm | <1 ppm |
| Ca | <1 ppm | <1 ppm |
| Mg | <1 ppm | <1 ppm |

The operation of the pilot plant with this purified oil is improved. In fact, no pressure drop increase is observed. Similarly, when unloading the reactor, no solid deposit is observed on the adsorbent.

Example 4 (Comparative)

Method of Preparing Methyl Esters and Glycerin from a Non-Pretreated Vegetable Crude Oil and Methanol This example comprises only a transesterification stage. The composition of the crude oil used in the transesterification reaction is given in Table 1. The phosphorus, calcium and magnesium content is given in Table 3.

The catalyst described above is used under the operating conditions that are also described above. Samples are taken when the plant is under stabilized regime conditions at various temperatures and analysed by gas chromatography (GC). The pilot plant never reaches stabilized regime conditions and the test has to be stopped as a result of clogging at the bed inlet after 4 days. Therefore, the non-pretreated crude oil cannot be used as the feed in the heterogeneous transesterification method.

Example 5 (According to the Invention)

Method of Preparing Methyl Esters and Glycerin from a Vegetable Oil and Methanol with High-Temperature Crude Oil Pre-Treatment This example comprises a high-temperature crude oil pre-treatment stage and a pre-treated oil transesterification stage.

The fatty acid composition of the oil fed into the pre-treatment reactor is given in Table 1. The phosphorus, calcium and magnesium content is given in Table 3.

The operating conditions are 180° C., 0.7 MPa, and a residence time of 1 hour.

At the reactor outlet, the fatty acid composition is unchanged (see Table 1). On the other hand, the phosphorus, calcium and magnesium content is given in Table 12. Determining the purification rate is delicate because of the detection limit of the analysis device.

TABLE 12

P, Ca, Mg, Fe composition of the rapeseed oil after pre-treatment at 180° C.

| Species | Content in ppm |
|---------|----------------|
| P  | <1 ppm |
| Ca | <1 ppm |
| Mg | <1 ppm |
| Fe | <1 ppm |

The pre-treated oil is then fed into the transesterification reactor. The catalyst and the operating conditions are the same as in Example 1.

Samples are taken when the plant is under stabilized regime conditions at different temperatures and analysed by GC. The analysis results are given in Table 13. No clogging is observed. The acid number of the purified crude oil, determined according to the EN14104 method, is 1.1 g KOH/g oil.

TABLE 13

Composition of the effluents of Example 5

| Mass % | Triglycerides wt. % | Diglycerides wt.$^a$ % | Monoglycerides wt. % | Methyl esters wt. % |
|--------|---------------------|------------------------|----------------------|---------------------|
| 185° C. | 8.2 | 5 | 4.8 | 82 |
| 165° C. | 22.5 | 10.1 | 5.3 | 62.1 |
| 175° C. | 12.4 | 9.8 | 5.1 | 72.7 |
| 185° C. (return point) | 8.8 | 5.2 | 5 | 81 |

$^a$% representing the diglycerides and sterols

The catalyst used with high-temperature oil pre-treatment has a stable activity over time. The catalytic activity of this catalyst is lower than that of a catalyst used with a DNS oil because of the residual fatty acid content. Carrying out a hot pre-treatment allows the transesterification method to use crude oil as the feed, which enables to do without the costlier conventional refining stages.

After transesterification, the effluents are separated by vaporization of the methanol, then by decantation. The glycerin and ester phases obtained are analysed by ICP. The phosphorus, calcium and magnesium content is given in Table 14. This table shows that the glycerin is free of phosphorus, calcium and magnesium.

TABLE 14

P, Ca, Mg composition in the glycerin and ester phases

| Species | Content in ppm (glycerin phase) | Content in ppm (ester phase) |
|---------|---------------------------------|------------------------------|
| P  | <1 ppm | <1 ppm |
| Ca | <1 ppm | <1 ppm |
| Mg | <1 ppm | <1 ppm |

Example 6 (According to the Invention)

Efficiency of Pre-Treatment on the Uptake of Glucosylated Sterols in a DNS Rapeseed Oil This example comprises a stage of pre-treatment of the DNS rapeseed oil doped with non-acylated glucosylated sterols (supplier: ASG, German laboratory) in a proportion of about a hundred ppm at high temperature.

Analysis of the content is given in the publication "Quantification of free and esterified steryl glucosides in vegetable oils and biodiesel" by Florence Lacoste, Franck Dejean, Hugues Griffon and Charlotte Rouquette, published in Eur. J. Lipid Sci. Technol. 2009, 111, 822-828. This analysis being complex and expensive, it has not been carried out systematically in the case of the previous examples, but we may assume that the results are identical.

The fatty acid composition of the oil fed into the pre-treatment reactor is given in Table 1. The phosphorus, calcium, magnesium and glucosylated sterols is given in Table 15.

TABLE 15

P, Ca, Mg and glucosylated sterol composition of the semi-refined rapeseed oil

| Species | Content in ppm |
|---------|----------------|
| P  | 9 |
| Ca | 5 |

TABLE 15-continued

P, Ca, Mg and glucosylated sterol composition of the semi-refined rapeseed oil

| Species | Content in ppm |
| --- | --- |
| Mg | 2 |
| Acylated glucosylated sterols | 25 |
| Non-acylated glucosylated sterols | 111 |

The operating conditions are 180° C., 0.7 MPa and a residence time of 1 hour.

At the reactor outlet, the fatty acid composition is unchanged (see Table 1). On the other hand, the phosphorus, calcium, magnesium, iron and glucosylated sterol content is given in Table 12. The pre-treatment shows high efficiency as regards removal of the non-acylated glucosylated sterols.

TABLE 16

P, Ca, Mg, Fe and glucosylated sterol composition of the rapeseed oil after pre-treatment at 180° C.

| Species | Content in ppm |
| --- | --- |
| P | <1 ppm |
| Ca | <1 ppm |
| Mg | <1 ppm |
| Fe | <1 ppm |
| Acylated glucosylated sterols | 28 |
| Non-acylated glucosylated sterols | 25 |

The entire disclosures of all applications, patents and publications, cited herein and of corresponding French application Ser. No. 09/06.097, filed Dec. 16, 2009 are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A method of producing fatty acid alkyl esters and glycerin, comprising:
    conducting one or more transesterification reactions between a crude or semi-refined vegetable or animal oil and an aliphatic monoalcohol in the presence of a heterogeneous catalyst,
    wherein said method comprises at least one oil pre-treatment stage comprising passing said oil into a pre-treatment reactor comprising at least one fixed bed of at least one adsorbent comprising a porous refractory oxide free of catalytic metals selected from metals of group 6 and groups 8 to 12 of the periodic table, at a temperature ranging between 140° C. and 320° C., at pressures ranging between 0.1 and 7 MPa and with a residence time ranging between 0.1 and 1 hour.

2. A method as claimed in claim 1, wherein the pre-treatment stage is carried out at a temperature ranging between 160° C. and 190° C., at a pressure ranging between 0.3 and 1 MPa, with a residence time ranging between 0.2 and 0.8 hour.

3. A method as claimed in claim 1, wherein the adsorbents used in the pretreatment stage are selected from among alumina, optionally activated, and silica-alumina.

4. A method as claimed in claim 3, wherein said adsorbents consist essentially of 100% porous refractory oxide selected from among alumina, optionally activated, and silica-alumina.

5. A method as claimed in claim 4, wherein said adsorbents are in form of spheres or extrudates, with a diameter ranging between 0.5 and 20 mm.

6. A method as claimed in claim 1, wherein the adsorbents contain a void fraction ranging between 0.2 and 0.75.

7. A method as claimed in claim 1, wherein said adsorbents exhibit a macropore volume, measured by mercury intrusion, for pores whose average diameter is 500 Å, above 0.1 ml/g, a total pore volume above 0.60 ml/g and a specific surface area expressed in $S_{BET}$ ranging between 30 and 320 m²/g.

8. A method as claimed in claim 1, wherein the pre-treatment stage is carried out in a reactor comprising several fixed adsorbent beds arranged in parallel and switchable.

9. A method as claimed in claim 1, wherein different adsorbents are superposed in at least two different beds of variable height.

10. A method as claimed in claim 9, wherein the adsorbents having the highest void fraction are used in the first bed(s) at the pre-treatment reactor inlet.

11. A method as claimed in claim 8, comprising switching the resultant the impurity-saturated adsorbent bed when the proportion of phosphorus, calcium, magnesium or iron in the oil from the pre-treatment stage is above 2 ppm.

12. A method as claimed in claim 11, comprising passing the impurity saturated adsorbent bed to a cleaning stage.

13. A method as claimed in claim 11, wherein the impurity-saturated adsorbent bed is valorized as an impurity-enriched solid.

14. A method as claimed in claim 1, applied to the semi-refined oils which are neutral or acid, virgin or recycled, and selected from among concrete or olein palm oil, soybean oil, palm nut oil, copra oil, babassu oil, rapeseed oil, conventional or oleic sunflower oil, corn oil, cotton oil, peanut oil, pourgher oil (*Jatropha curcas*), castor oil, linseed oil and crambe oil, all the oils obtained from sunflower and rapeseed, or obtained from algae, partly modified oils, by polymerization or oligomerization for example, such as linseed oil and sunflower stand oils, and blown vegetable oils.

15. A method as claimed in claim 1, wherein transesterification is conducted at temperatures ranging between 130° C. and 220° C., at pressures below 10 MPa, with excess monoalcohol with respect to the oil/alcohol stoichiometry.

16. A method according to claim 6, Wherein the void fraction is between 0.35 and 0.5.

17. A method of producing fatty acid alkyl esters and glycerin, consisting of:
    at least one oil pre-treatment stage comprising passing a crude or semi-refined vegetable or animal oil into a pre-treatment reactor comprising at least one fixed bed of at least one adsorbent comprising a porous refractory oxide free of catalytic metals selected from metals of group 6 and groups 8 to 12 of the periodic table, at a temperature ranging between 140° C. and 320° C., at pressures ranging between 0.1 and 7 MPa and with a residence time ranging between 0.1 and 1 hour, and
    conducting one or more transesterification reactions between the pre-treated oil and an aliphatic monoalcohol in the presence of a heterogeneous catalyst.

\* \* \* \* \*